United States Patent
Kraps

[11] Patent Number: 5,758,986
[45] Date of Patent: Jun. 2, 1998

[54] DEVICE FOR A BEARING OF A JOINT IN A RETAINING OPENING

[75] Inventor: Jakob Kraps, Dormagen, Germany

[73] Assignee: TRW Fahrwerksystems GmbH & Co. KG, Dusseldorf, Germany

[21] Appl. No.: 754,017

[22] Filed: Nov. 20, 1996

[30] Foreign Application Priority Data

Nov. 23, 1995 [DE] Germany ......................... 195 43 688.1

[51] Int. Cl.$^6$ ........................................... F16C 11/06
[52] U.S. Cl. .................... 403/135; 403/136; 403/138; 403/122
[58] Field of Search ........................ 403/135, 136, 403/137, 122, 140, 138, 143, 144, 131, 132, 133

[56] References Cited

U.S. PATENT DOCUMENTS

| | | | |
|---|---|---|---|
| 1,799,141 | 3/1931 | Hufferd et al. ............... | 403/136 |
| 2,390,289 | 12/1945 | Beckwity ..................... | 403/138 X |
| 2,426,358 | 8/1947 | Klages et al. ................ | 403/136 |
| 2,451,060 | 10/1948 | Booty .......................... | 403/132 |
| 2,705,163 | 3/1955 | Marquis ....................... | 403/140 |
| 2,855,665 | 10/1958 | Alldredge ..................... | 403/138 X |
| 3,598,434 | 8/1971 | Keiser et al. ................. | 403/138 X |
| 4,163,617 | 8/1979 | Nemoto ........................ | 403/132 |
| 4,606,668 | 8/1986 | Schmidt . | |
| 4,624,674 | 11/1986 | Pappas et al. . | |
| 5,290,120 | 3/1994 | Osterfeld et al. . | |
| 5,564,853 | 10/1996 | Maughan ...................... | 403/135 X |

FOREIGN PATENT DOCUMENTS

| | | | |
|---|---|---|---|
| 17278 | 9/1934 | Australia ...................... | 403/138 |
| 0082638 | 6/1983 | European Pat. Off. . | |
| 998406 | 1/1952 | France . | |
| 2170608 | 9/1973 | France . | |
| 2394704 | 1/1979 | France . | |
| 2597176 | 10/1989 | France . | |
| 7422 | 3/1956 | Germany ...................... | 403/138 |
| 4211897 | 10/1993 | Germany . | |
| 161352 | 4/1921 | United Kingdom . | |
| 1246287 | 9/1971 | United Kingdom . | |
| 2006319 | 5/1979 | United Kingdom . | |
| 2171449 | 8/1986 | United Kingdom . | |

*Primary Examiner*—Harry C. Kim
*Attorney, Agent, or Firm*—Tarolli, Sundheim, Covell, Tummino & Szabo

[57] ABSTRACT

The invention concerns a device for securing a bearing shell (2) of a joint, particularly for suspension systems of motor vehicles, in a retaining opening (3a), particularly of a suspension rod or stabilizer. In order to reduce the processing efforts necessary for securing the bearing shell (2) and thus the manufacturing costs, the bearing shell (2) is formed with a conical cover surface (2a), which narrows in the direction of the coupling pin (1), on which a clamp collar (6) with a correspondingly conical opposing surface (6a) is arranged which is supported with its cylindrical cover surface (6b) in the retaining opening (3a).

9 Claims, 3 Drawing Sheets

DEVICE FOR A BEARING OF A JOINT IN A RETAINING OPENING

BACKGROUND OF THE INVENTION

The invention concerns a device for securing a bearing shell of a joint, particularly for suspension systems of motor vehicles, in a retaining opening, in particular of a suspension rod or stabilizer.

Joints for suspension systems of motor vehicles are known in many types of embodiments. The joints respectively comprise a turnable bearing neck and/or a bearing neck which can be tilted to a limited extent which, in the case of most joint arrangements, is in the form of a ball pivot and is connected to a part of the suspension system or the chassis. By means of the bearing shell accommodating the bearing neck, the joint is connected to the chassis or a part of the suspension system, so that these two parts can be moved to a limited extent with respect to each other via the joint.

In order to secure the bearing shell of such joints in a retaining opening of the respective part, it is known to provide the bearing shell with holding flanges which, after the bearing shell has been placed in the retaining opening, are plastically deformed in order to hold the bearing shell in the retaining opening. Furthermore, it is known, particularly in the case of bearing shells made from a synthetic material, to provide these with elastically deformable holding hooks which, after the bearing shell has been placed into a retaining opening, grip behind especially provided holding surfaces and in this way, hold the bearing shell inside the retaining opening.

The disadvantage of this known design for securing a bearing shell of a joint in a retaining opening is to be found in that not only must the retaining opening be precisely adapted to the dimensions of the bearing shell to be used, but also that the holding surfaces, which interact with the plastically or elastically deformable parts of the holding shell, must be produced with great precision.

It is the task of the invention to create a device for securing a bearing shell of a joint in a retaining opening, wherein not only special holding surfaces for the purpose of securing the bearing shell in the retaining opening are omitted, but also the requirements for the precision of the retaining opening are reduced, so that altogether this results in a reduction in cost for securing the bearing shell.

The solution of this task by means of the invention is characterized in that the bearing shell is formed with a conical cover surface that decreases in the direction of the coupling pin and on which a clamp collar with an appropriately conical opposing surface is arranged which is supported with its cylindrical cover surface inside the retaining opening.

With the design of the invention, the bearing shell is secured inside the retaining opening without additional contact surfaces simply on the basis of a radial expansion taking place by means of the conical opposing surface of the bearing shell and the conical opposing surface of the clamp collar. By means of an appropriate design of the conical surfaces, a high degree of precision for the retaining opening is not required. In this way, the processing effort and thus the processing costs can be reduced considerably.

In a further embodiment in accordance with the invention, the clamp collar may be provided with a transverse hole for a bearing pin which, in turn, grips into bearing apertures of the structural component accommodating the bearing shell. In a simple way, this results in a form-fitted securing of the clamp collar on the structural component. Preferably, the transverse hole is formed in the area of a closed bottom [base] of the can-shaped clamp collar.

In the case of an alternative further refinement of the invention, the clamp collar is provided with a support surface for an expanding spring, arranged between the clamp collar and the bearing shell. This results in an automatic seating of the bearing shell with simultaneous compensation for tolerance and play during wear and tear. In preferred embodiments of the invention, the expanding spring may be in the form of a rubber ring or a conical spring.

Finally, the invention proposes that the bearing shell and the clamp collar be manufactured from a synthetic material, preferably polyacetalene (POM) so that, on the one hand, good bearing properties for the bearing neck and, on the other hand, a reliable securing in the retaining opening of the respective structural component can be achieved.

BRIEF DESCRIPTION OF THE DRAWINGS

In the drawing, three examples of the device of the invention are indicated, wherein.

DESCRIPTION OF PREFERRED EMBODIMENTS

Figure 1:
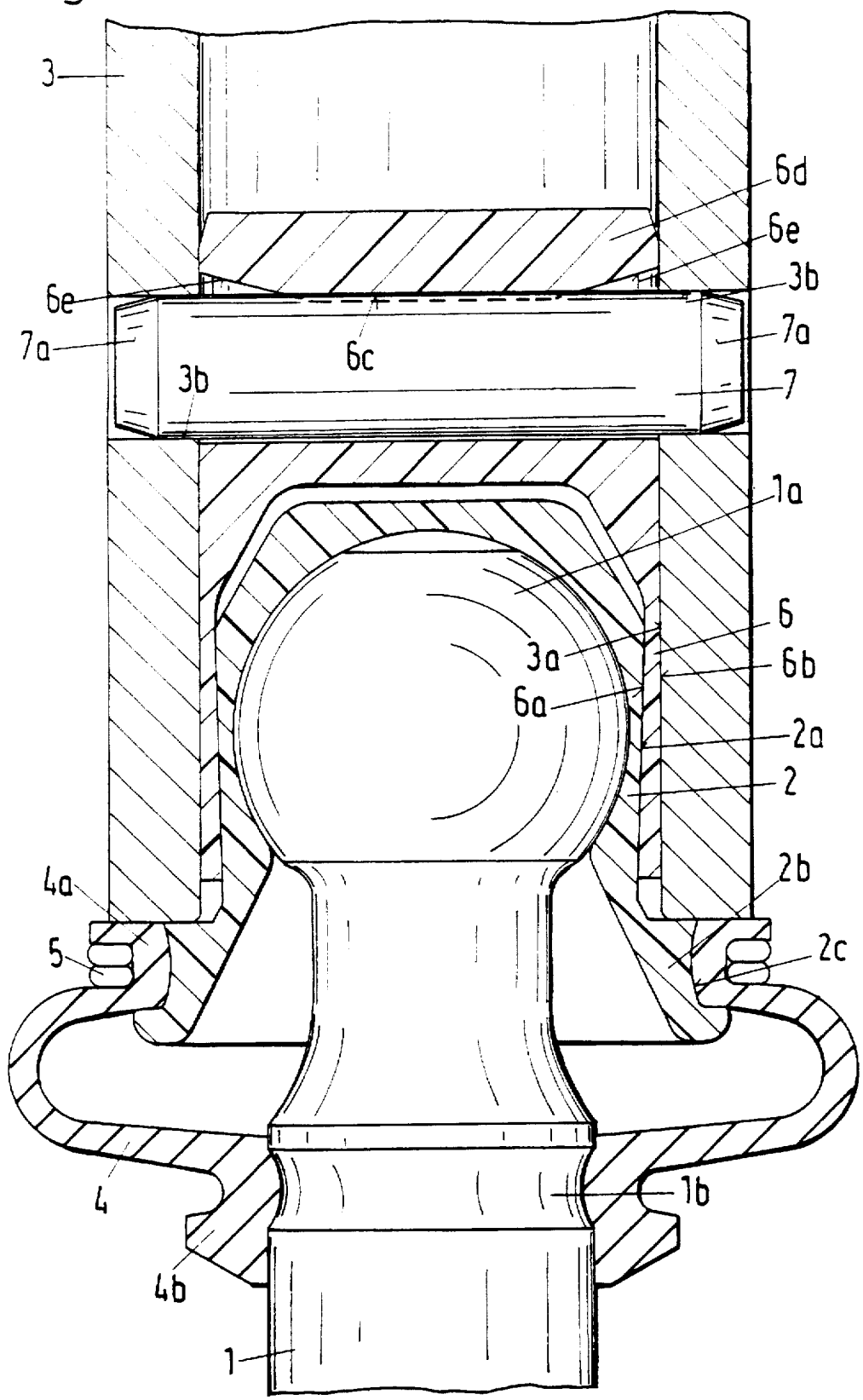
FIG. 1 shows a longitudinal cross section through a ball-and-socket joint, provided with a bearing shell of the invention, which is arranged inside the end of a pipe-shaped component.

In all three examples, the joint is in the form of a ball-and-socket joint whose coupling pin (1), provided with a flattened ball head (1a), is rotatably mounted in a bearing shell (2) where it can be pivoted to a limited extent, wherein the bearing shell, in turn, is arranged inside a retaining opening (3a) of a structural component (3), particularly a part of a suspension system for motor vehicles, for example, a suspension rod or a stabilizer.

The example shown in FIG. 1 shows the end of a pipe-shaped stabilizer. The structural component (3) in the example according to FIG. 2, for example, is a suspension rod of a suspension system. In the case of the structural component (3) of the third embodiment according to FIG. 3, a portion of a chassis may be involved on which a suspension system is supported with the aid of the indicated ball-and-socket joint.

In the case of all three embodiments, the bearing shell (2) is formed with a conical cover surface (2a), narrowing in the direction of the coupling pin (1). Furthermore, in the case of all three embodiments, an annular collar (2b) adjoins the coupling-pin-side end of the cover surface (2a); the inner side of the collar limits the pivot angle of the coupling pin (1), and the outside is provided with an annular groove (2c). Into this annular groove (2c), the edge reinforcement (4a) of a bellows sealing element (4) on the bearing shell side is placed, which seals off the ball-and-socket joint between the bearing shell (2) and the coupling pin (1). The coupling-pin-side end of this bellows sealing element (4) is also secured by means of an edge reinforcement (4b) inside a groove (1b) of the coupling pin (1). For the purpose of securing the respective edge reinforcements (4a) or (4b), a clamping ring (5) may also be used, which, in all three examples, is shown in connection with the edge reinforcement (4a).

The securing of the bearing shell (2) in the respective retaining opening (3a) takes place with the aid of a clamp collar (6) whose inner surface is in the form of an opposing surface (6a) corresponding to the conical cover surface (2a) of the bearing shell (2) and which is provided with a cylindrical cover surface (6b) corresponding to the retaining opening (3a).

For the purpose of forming the ball-and-socket joint with the retaining opening (3a) of the respective structural component (3), first the coupling pin (1) with its ball head (1a) with the applied bellows sealing element (4) is placed into the bearing shell (2) and the edge reinforcements (4a) and (4b) of the bellows sealing element (4) are secured in the annular groove (2c) or the groove (1b). Subsequently, the clamp collar (6) with its conical opposing surface (6a) is placed on the conical cover surface (2a) of the bearing shell (2) as deeply as possible, so that the cylindrical cover surface (6b) assumes the smallest possible outer diameter. Then, the bearing shell (2), provided with the clamp collar (6), is introduced into the retaining opening (3a) of the structural component (3) until the collar (2b) comes to rest on the opposing outer surfaces of the structural component (3). By means of a movement of the clamp collar (6), that is directed away from the coupling pin (1) relative to the bearing shell (2), a form-fitted spreading of the clamp collar (6) takes place via the conical cover surface (2a) and the conical opposing surface (6a), so that it subsequently comes to rest without play with its cylindrical cover surface (6b) on the cylindrical surface of the retaining opening (3a). By selecting suitable conical angles and lengths of the surfaces (2a) and (6a), an even greater tolerance with respect to the retaining opening (3a) may be compensated hereby as well.

In order to secure the clamp collar (6) in its position of holding the bearing shell (2) in the retaining opening (3a) of the structural component (3), in the first example according to FIG. 1, a bearing pin (7), provided with conical end surfaces (7a), is used which, on the one hand, engages a transverse hole (6c) of the clamp collar and, on the other hand, engages bearing openings (3b) of the structural component (3). In the example, the transverse hole (6c) is formed in the area of the bottom (6d) of the can-like clamp collar (6). In order to assure a reliable spreading of the clamp collar (6) during introduction of the bearing pin (7), the transverse hole (6c) in the example is provided on both sides with a tightening slope (6e). As can be seen from FIG. 1, this design results in a form-fitted securing of the clamp collar (6) on the structural component (3) and thus the form-fitted securing of the bearing shell (2) with the aid of the clamp collar (6) inside the retaining opening (3a) of the structural component (3).

Figure 2:
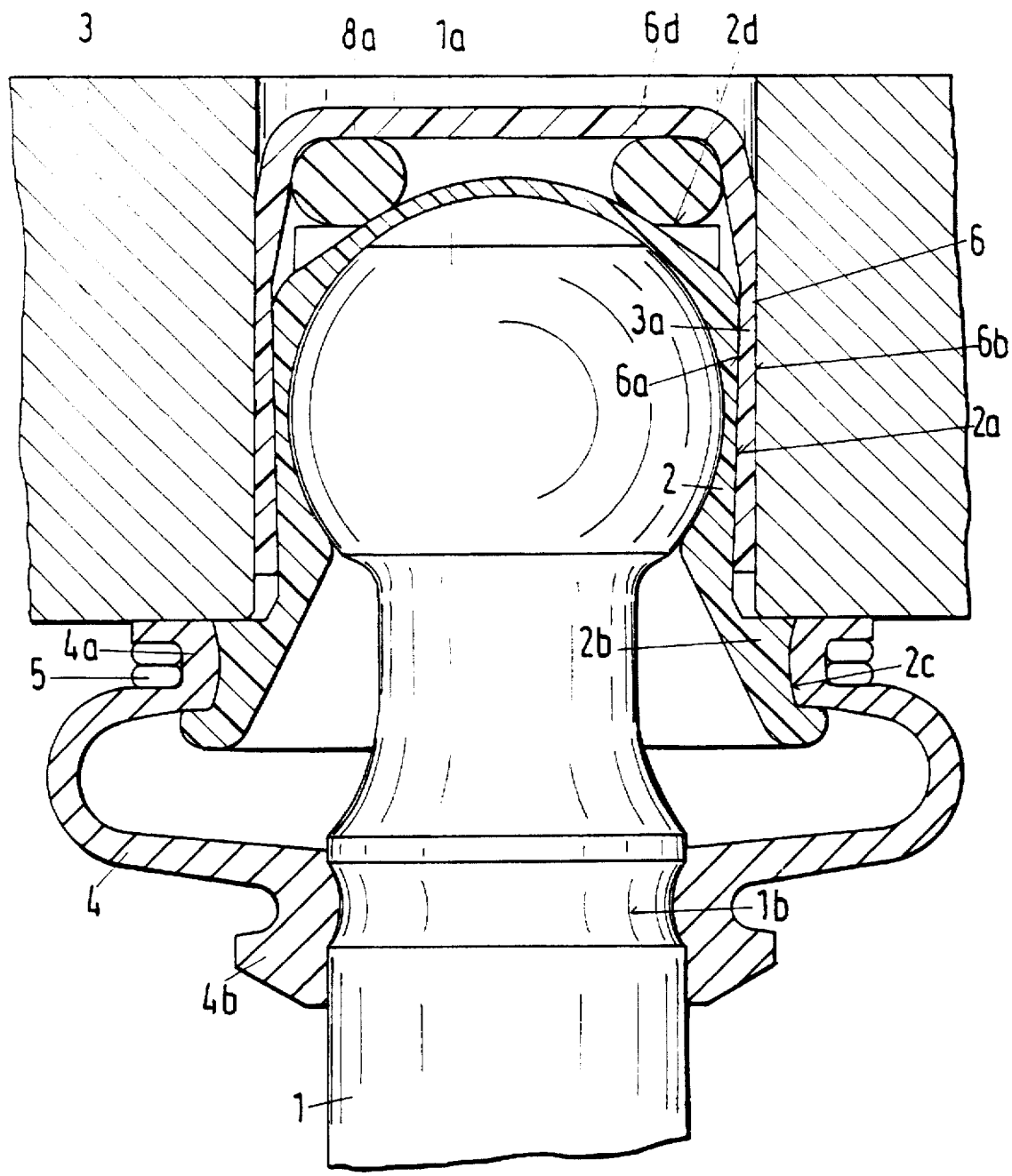
FIG. 2 shows a longitudinal cross section through a second embodiment, corresponding to FIG. 1, with a bearing shell secured in a through-hole of a structural component
Figure 3:
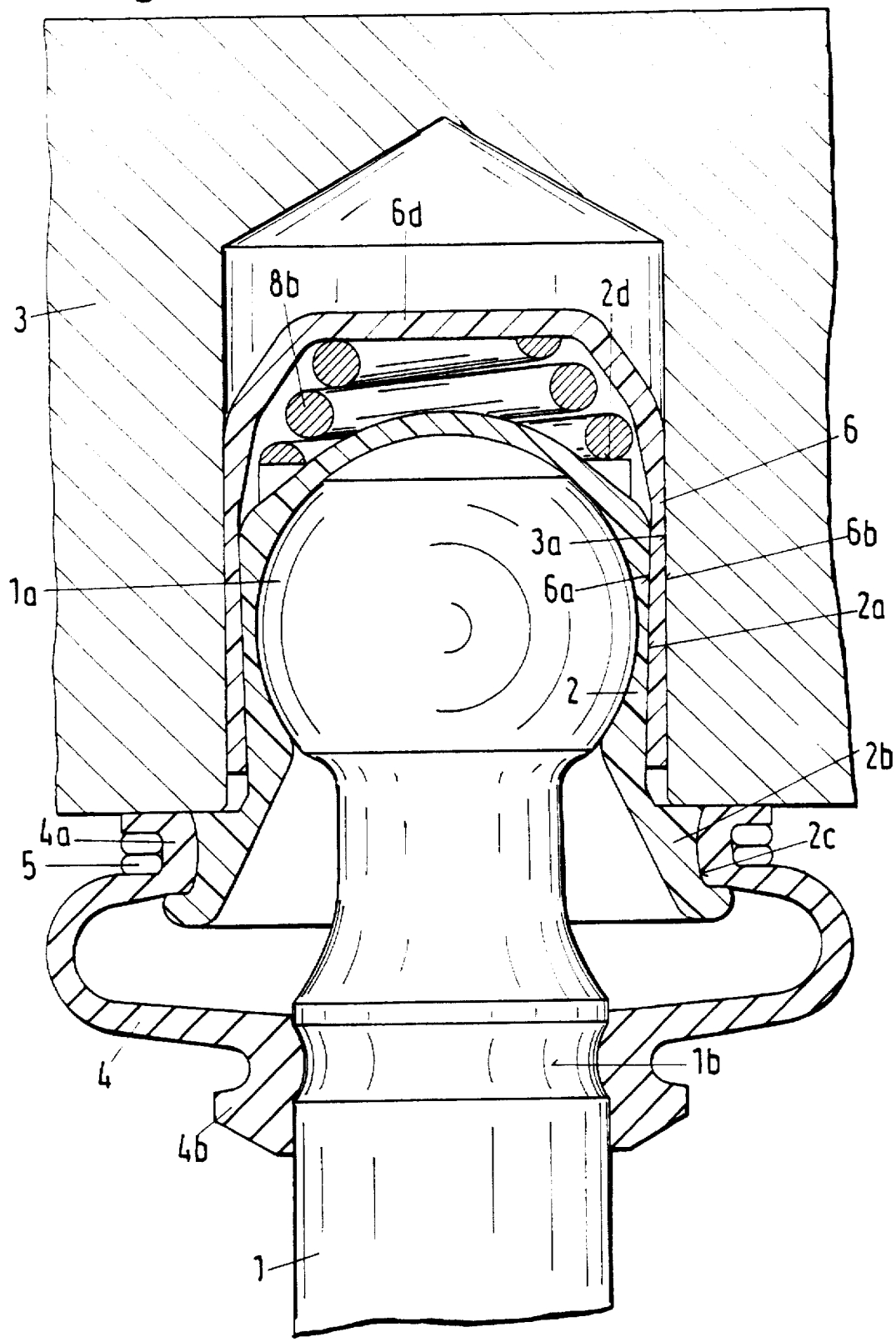
FIG. 3 shows an additional longitudinal cross section through a ball-and-socket joint in a third embodiment of the bearing shell which is arranged in a blind hole of a structural component.

In the case of the two examples according to FIGS. 2 and 3, the clamp collar (6) is secured in a force-locking manner in the position securing the bearing shell (2) inside the retaining opening (3a). For this purpose, between the clamp collar (6) (again can-shaped in the embodiments) and the bearing shell (2), respectively, an expanding spring (8a) or (8b) is arranged. In the example according to FIG. 2, this expanding spring (8a) is formed by a rubber ring. In the example according to FIG. 3, the expanding spring (8b) is in the form of a conical spring.

In both cases, the expanding spring (8a) or (8b), arranged between a support surface (2d) of the bearing shell (2) and the bottom (6d) of the clamp collar (6), produces a force which is applied to the clamp collar (6) in a direction pointing away from the coupling pin (1) and via the conical surfaces (2a) and (6a) brings about a spreading of the clamp collar (6). Thus, with the embodiments according to FIGS. 2 and 3, not only a tolerance compensation with respect to the dimensions of the retaining opening (3a) takes place automatically, but also a play compensation during wear and tear at the bearing surface between the ball head (1a) and the bearing shell (2).

Reference symbols
1 coupling pin
1a ball head
1b groove
2 bearing shell
2a cover surface
2b collar
2c annular groove
2d support surface
3 structural component
3a retaining opening
3b bearing opening
4 bellows sealing element
4a edge reinforcement
4b edge reinforcement
5 clamping ring
6 clamp collar
6a opposing surface
6b cover surface
6c transverse hole
6d bottom
6e tightening slope
7 bearing pin
7a end surface
8a expanding spring
8b expanding spring Having described the invention, the following is claimed:

1. An apparatus to be mounted in an opening in a structure, the opening being defined by a cylindrical surface, said apparatus comprising:

a coupling pin (1) having a first portion (1a) adapted to be located in the opening and a second portion (1b) for projecting out of the opening;

a bearing shell (2) having an inner surface for receiving said first portion (1a) of said coupling pin (1), said bearing shell (2) having a conical outer surface (2a) encircling said bearing shell and tapering inwardly as said conical outer surface (2a) extends toward said second portion (1b) of said coupling pin (1); and a clamp collar (6) having a cylindrical outer surface (6b) for engaging the cylindrical surface defining the opening in the structure, said clamp collar (6) further having a conical inner surface (6a) corresponding to and engaging said conical outer surface (2a) of said bearing shell (2), said conical surfaces (2a, 6a) comprising means for radially clamping said cylindrical outer surface (6b) of said clamp collar (6) against the cylindrical surface defining the opening in the structure to secure said bearing shell (2) in the opening.

2. The apparatus of claim 1 wherein said clamp collar (6) has a transverse hole (6c) for receiving a bearing pin (7)

which, in turn, is adapted to be received in a bearing opening (3b) in the structure.

3. The apparatus of claim 2 wherein said transverse hole (6c) is formed in a closed bottom portion of said clamp collar (6).

4. The apparatus of claim 1 wherein said clamp collar (6) has a support surface for supporting an expanding spring (8a, 8b) between said clamp collar (6) and said bearing shell (2).

5. The apparatus of claim 4 wherein said expanding spring comprises a rubber ring (8a).

6. The apparatus of claim 4 wherein said expanding spring comprises a conical spring (8b).

7. The apparatus of claim 1 wherein said bearing shell (2) and said clamp collar (6) are made of a synthetic material.

8. The apparatus of claim 7 wherein said bearing shell (2) and said clamp collar (6) are made of polyacetalene.

9. The apparatus of claim 1 wherein said bearing shell (2) has a contact surface for axially positioning said bearing shell relative to the structure.

* * * * *

UNITED STATES PATENT AND TRADEMARK OFFICE
CERTIFICATE OF CORRECTION

PATENT NO. : 5,758,986
DATED : June 2, 1998
INVENTOR(S) : Jakob Kraps

It is certified that error appears in the above-indentified patent and that said Letters Patent is hereby corrected as shown below:

Item [73],
Cover Page, Assignee should read as follows: TRW Fahrwerksysteme GmbH & Co. KG, Dusseldorf, Germany Signed and Sealed this Twentieth Day of October, 1998

Attest:

BRUCE LEHMAN

*Attesting Officer*    *Commissioner of Patents and Trademarks*